United States Patent
Niessner et al.

Patent Number: 5,652,307
Date of Patent: Jul. 29, 1997

[54] THREE STAGE GRAFT COPOLYMERS AND WEATHERING-STABLE, DULL THERMOPLASTIC MOLDING MATERIALS CONTAINING SAID COPOLYMERS AND HAVING GOOD LOW-TEMPERATURE TOUGHNESS

[75] Inventors: Norbert Niessner, Friedelsheim; Wolfgang Fischer, Ludwigshafen, both of Germany

[73] Assignee: BASF Aktiengesellschaft, Ludwigshafen, Germany

[21] Appl. No.: 730,808

[22] Filed: Oct. 17, 1996

Related U.S. Application Data

[62] Division of Ser. No. 352,750, Dec. 2, 1994, Pat. No. 5,585,436.

Foreign Application Priority Data

Dec. 9, 1993 [DE] Germany ............... 43 42 045.1

[51] Int. Cl.$^6$ ............................................ C08F 283/12
[52] U.S. Cl. ........................... 525/101; 525/104; 525/106; 525/426; 525/431; 525/445; 525/446; 525/455; 525/474; 525/479
[58] Field of Search .................... 525/101, 104, 525/106, 426, 431, 445, 446, 455, 474, 479

References Cited

U.S. PATENT DOCUMENTS 5,585,436 12/1996 Niessner et al. ............... 525/105

*Primary Examiner*—Margaret W. Glass
*Attorney, Agent, or Firm*—Keil & Weinkauf

[57] ABSTRACT

Graft copolymers obtained by
(A) polymerizing 10 to 89 wt % of a mixture consisting essentially of either (a1) from 70 to 99.89 wt % of a $C_1$–$C_{18}$-alkyl ester of acrylic acid,
(a2) from 0.1 to 10 wt % of a polyfunctional monomer,
(a3) from 0 to 29.89 wt % of an ethylenically unsaturated monomer which differs from (a1) and (a2), is copolymerizable therewith and carries no acid group and
(a4) from 0.01 to 10 wt % of a copolymerizable monomer containing at least one acid group or (a5) from 49.99 to 99.99 wt % of at least one diene,
(a6) from 0 to 50 wt % of a monomer which is copolymerizable therewith and carries no acid group and
(a7) from 0.01 to 10 wt % of a copolymerizable monomer containing at least one acid group in the presence of from 1 to 80 wt % of a cross-linked silicone rubber to form a copolymer A,
and
(B) polymerizing 10 to 89 wt % of a mixture consisting essentially of (b1) from 50 to 99.99 wt % of a styrene compound of the formula (I)

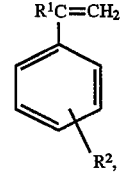

where $R^1$ and $R^2$ independently of one another are each hydrogen, $C_1$–$C_8$-alkyl, etc.

(b2) from 0 to 50 wt % of a methacrylonitrile, acrylonitrile, methacrylic acid, acrylic acid, maleic anhydride, etc. monomer and (b3) from 0.01 to 20 wt % of a copolymerizable monomer containing at least one basic group in the presence of the graft copolymer (A) and used to prepare thermoplastic molding materials.

7 Claims, No Drawings

THREE STAGE GRAFT COPOLYMERS AND WEATHERING-STABLE, DULL THERMOPLASTIC MOLDING MATERIALS CONTAINING SAID COPOLYMERS AND HAVING GOOD LOW-TEMPERATURE TOUGHNESS

This is a divisional of application Ser. No. 08/352,750, filed Dec. 2, 1994, now U.S. Pat. No. 5,585,436.

The invention is directed to graft copolymers prepared by (A) polymerization of from 10 to 89% by weight of a mixture consisting essentially of either (a1) from 70 to 99.89% by weight of a $C_1$–$C_{18}$-alkyl ester of acrylic acid, where the alkyl radical may be mono-substituted by phenyl or phenoxy, (a2) from 0.1 to 10% by weight of a polyfunctional monomer, (a3) from 0 to 29.89% by weight of an ethylenically unsaturated monomer which differs from (a1) and (a2), is copolymerizable therewith and carries no acid group and (a4) from 0.01 to 10% by weight of a copolymerizable monomer containing at least one acid group or (a5) from 49.99 to 99.99% by weight of at least one diene, (a6) from 0 to 50% by weight of a monomer which is copolymerizable therewith and carries no acid group and (a7) from 0.01 to 10% by weight of a copolymerizable monomer containing at least one acid group in the presence of from 1 to 80% by weight of a crosslinked silicone rubber and (B) polymerization of from 10 to 89% by weight of a mixture consisting essentially of (b1) from 50 to 99.99% by weight of a styrene compound of the formula (I)

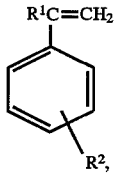

$$R^1C=CH_2 \quad\quad I$$

$$R^2,$$

where $R^1$ and $R^2$ independently of one another are each hydrogen, $C_1$–$C_8$-alkyl or $C_1$–$C_4$-alkyl-monosubstituted, $C_1$–$C_4$-alkyl-disubstituted or $C_1$–$C_4$-alkyl-trisubstituted phenyl, and/or of a $C_1$–$C_8$-alkyl ester of methacrylic or acrylic acid, (b2) from 0 to 50% by weight of a monomer selected from the group consisting of methacrylonitrile, acrylonitrile, methacrylic acid, acrylic acid, maleic anhydride, maleimide N-substituted by $C_1$–$C_4$-alkyl, vinyl esters of aliphatic $C_2$–$C_8$-carboxylic acids, acrylamide and vinyl methyl ether and (b3) from 0.01 to 20% by weight of a copolymerizable monomer containing at least one basic group in the presence of the graft copolymer (A).

The present invention furthermore relates to thermoplastic molding materials consisting essentially of the novel graft copolymers and at least one polymer having a glass transition temperature of more than 25° C., processes for the preparation of the novel graft copolymers and thermoplastic molding materials, the use of the novel graft copolymers for the preparation of thermoplastic molding materials, the use of the novel thermoplastic molding materials for the production of moldings, and moldings obtainable from these thermoplastic molding materials.

Graft copolymers containing essentially a core comprising a silicone rubber, a first shell based on an alkyl ester of acrylic acid and an outer shell based on a resin-forming monomer are disclosed, for example, in EP-A 246,537. However, the fact that the combination of the properties low-temperature toughness, weathering stability and dull surface is unsatisfactory in the case of molding materials prepared therefrom is disadvantageous.

It is known that polymers having both acidic and basic groups can be used for the production of dull surfaces. Thus, DE 34 05 938 describes polymer blends having a dull surface and based on graft copolymers possessing acidic functions and thermoplastic resins having basic functions. DE 34 21 353 describes the use of acidic and at the same time basic monomers in the graft of a rubber component, and the use of these graft rubbers as dulling agents. EP-A 450 511 describes molding materials consisting of a rubber core containing acid groups and comprising acrylate or diene rubber and a shell grafted thereon and comprising vinyl aromatic and polymerized monomers with a basic comonomer. These dull molding materials based on acrylate rubber generally have satisfactory to good toughness at room temperature in combination with good weathering stability. However, the low-temperature toughness, in particular at −40° C., is insufficient. On the other hand, dull molding materials based on diene rubber have good low-temperature toughness but poor weathering stability.

It is an object of the present invention to provide graft copolymers which can be processed to thermoplastic molding materials, the latter having both good low-temperature toughness and good weathering stability in combination with a dull surface.

We have found that this object is achieved by the graft copolymers defined at the outset.

We have also found thermoplastic molding materials consisting essentially of novel graft copolymers and at least one polymer having a glass transition temperature of more than 25° C., processes for the preparation of the novel graft copolymers and thermoplastic molding materials, the use of the novel graft copolymers for the preparation of thermoplastic molding materials, the use of the novel thermoplastic molding materials for the production of moldings, and moldings obtainable from these thermoplastic molding materials.

Suitable crosslinked silicone rubbers for the formation of the novel core are in general crosslinked silicone rubbers comprising units of the general formulae $R_2SiO$, $RSiO_{3/2}$, $R_3SiO_{1/2}$ and $SiO_{2/4}$, where R is a monovalent radical and, in the case of $R_3SiO_{1/2}$, may furthermore be OH. The amounts of the individual siloxane units are usually such that there are from 0 to 10 molar units of the formula $RSiO_{3/2}$, from 0 to 1.5 molar units of $R_3SiO_{1/2}$ and from 0 to 3 molar units of $SiO_{2/4}$ per 100 units of the formula $R_2SiO$.

R is $C_1$–$C_{18}$-alkyl, preferably $C_1$–$C_{12}$-alkyl, particularly preferably $C_1$–$C_6$-alkyl, such as methyl, ethyl, n-propyl, isopropyl, n-butyl, isobutyl, sec-butyl, tert-butyl, pentyl or hexyl, in particular methyl or ethyl, or $C_6$–$C_{10}$-aryl, such as phenyl or naphthyl, in particular phenyl, or $C_1$–$C_{10}$-alkoxy or aryloxy, such as methoxy, ethoxy or phenoxy, or groups which can be attacked by free radicals, e.g. vinyl, allyl, phenyl, halogen or mercapto, preferably vinyl- or mercapto-$C_1$–$C_4$-alkyl, in particular mercaptopropyl, phenyl or vinyl.

In a particular embodiment, silicone rubbers in which at least 80% of all radicals R are methyl are used. Silicone rubbers in which R is methyl or ethyl are also preferred.

In a further embodiment, silicone rubbers which contain the abovementioned groups which can be attached by free radicals are used in amounts of from 0.01 to 10, preferably from 0.2 to 2, mol %, based on all radicals R. Such silicone rubbers are described, for example, in EP-A 260 558 and in EP-A 492 376.

Furthermore, the silicone rubbers described in DE-A 25 39 572 or those disclosed in EP-A 370 347 may be used as cores.

According to the invention, the core is used in an amount of from 1 to 80, preferably from 5 to 70, particularly preferably from 10 to 30, % by weight, based on the total amount of graft copolymer.

According to the invention, the component (A) is a mixture consisting essentially of (a1) from 70 to 99.89, preferably from 75 to 99.5, particularly preferably from 80 to 99, % by weight of a $C_1$–$C_{18}$-alkyl ester of acrylic acid, where the alkyl radical may be monosubstituted by phenyl or phenoxy,.

(a2) from 0.1 to 10, preferably from 0.5 to 5, particularly preferably from 1 to 3, % by weight of a polyfunctional monomer, (a3) from 0 to 29.89, preferably from 0 to 20, particularly preferably from 0 to 10, % by weight of an ethylenically unsaturated monomer which differs from (a1) and (a2), is copolymerizable therewith and carries no acid groups and (a4) from 0.01 to 10, preferably from 0.1 to 5, particularly preferably from 0.5 to 2, % by weight of a copolymerizable monomer containing at least one acid group or (a5) from 49.99 to 99.99, preferably from 79.99 to 99.9, particularly preferably from 85.5 to 99.5, % by weight of at least one diene, (a6) from 0 to 50, preferably from 0 to 20, particularly preferably from 0 to 15, % by weight of a monomer which differs from (a5), is copolymerizable therewith and carries no acid group and (a7) from 0.01 to 10, preferably from 0.1 to 5, particularly preferably from 0.5 to 2, % by weight of a copolymerizable monomer containing at least one acid group.

Preferably used $C_1$–$C_{18}$-alkyl esters of acrylic acid (component (a1)) are the $C_2$–$C_8$-alkyl esters, such as ethyl, n-propyl, isopropyl, n-butyl, isobutyl, tert-butyl, sec-butyl, pentyl, hexyl, heptyl, n-octyl or 2-ethylhexyl acrylate, preferably ethyl, n-propyl, n-butyl and 2-ethylhexyl acrylate. The $C_1$–$C_{18}$-alkyl esters may furthermore be substituted by phenyl or phenoxy, phenyl-$C_1$–$C_4$-alkyl esters, such as benzyl acrylate, phenylethyl acrylate, phenylpropyl acrylate or phenoxyethyl acrylate, being preferred. The substituted $C_1$–$C_{18}$-alkyl esters may also be used as a mixture with unsubstituted $C_1$–$C_{18}$-alkyl esters of acrylic acid, at least one $C_1$–$C_{18}$-alkyl ester of acrylic acid preferably being employed.

Examples of suitable polyfunctional monomers (component (a2)) are vinylically unsaturated compounds having at least two double bonds, such as vinylbenzenes, such as divinylbenzene and trivinylbenzene;

triallyl cyanurate and triallyl isocyanurate;

diallyl maleate, diallyl fumarate and diallyl phthalate, which usually have a crosslinking effect.

Observations to date have shown that unsaturated monomers which are graft-linking and may have a crosslinking effect and carry epoxy, hydroxyl, carboxyl, amino or anhydride groups, such as hydroxy-$C_1$–$C_6$-alkylmethacrylates and hydroxy-$C_1$–$C_6$-alkyl acrylates, preferably hydroxyethyl methacrylate, hydroxypropyl methacrylate, hydroxyethyl acrylate and hydroxypropyl acrylate, are also suitable.

The tricyclodecenyl acrylates Ia and Ib

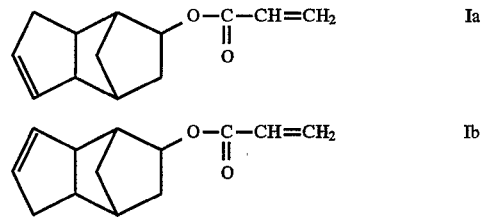

(cf. DE-A 1,260,135), which may also be used in the form of their mixtures, have proven particularly suitable monomers for the component (A2).

Preferably used ethylenically unsaturated monomers which contain no acid group and differ from the components (a1) and (a2) but are copolymerizable with these components (component (a3)) are vinyl aromatic.monomers such as styrene, α-methylstyrene, p-methylstyrene, tert-butylstyrene, 1,1-diphenylethylene, monochlorostyrene and vinyltoluene, particularly preferably styrene;

acrylonitrile and methacrylonitrile, preferably acrylonitrile;

$C_1$–$C_4$-esters of acrylic and methacrylic acid such as methyl methacrylate (MMA), ethyl methacrylate, n-propyl methacrylate, isopropyl methacrylate, n-butyl methacrylate, isobutyl methacrylate, sec-butyl methacrylate and tert-butyl methacrylate, methyl methacrylate being particularly preferred, and mixtures of these monomers, methyl acrylate (MA), ethyl acrylate, propyl acrylate, n-butyl acrylate, isobutyl acrylate, sec-butyl acrylate and tert-butyl acrylate, methyl acrylate being particularly preferred, and mixtures of these monomers;

$C_5$–$C_8$-cycloalkyl esters of acrylic and methacrylic acid, such as cyclopentyl, cyclohexyl, cycloheptyl and cyclooctyl acrylate, cyclopentyl, cyclohexyl, cycloheptyl and cyclooctyl methacrylate, preferably cyclohexyl methacrylate;

isobornyl methacrylate;

maleimides which are substituted at the imide nitrogen atom by $C_1$–$C_6$-alkyl, such as methyl, ethyl, n-propyl, isopropyl, n-butyl, isobutyl, sec-butyl, tert-butyl, pentyl or hexyl, preferably N-methylmaleimide, and N-$C_6$–$C_{10}$-aryl- or N-$C_6$–$C_{10}$-aryl-$C_1$–$C_4$-alkyl-substituted maleimides, where the aryl groups may be monosubstituted, disubstituted or trisubstituted by $C_1$–$C_4$-alkyl, such as N-phenylmaleimide and N-tolylmaleimide, preferably N-phenylmaleimide;

maleic anhydride as well as $C_1$–$C_6$-alkyl maleates and di-$C_1$–$C_6$-alkyl maleates, preferably maleic anhydride;

dienes, such as butadiene and isoprene, preferably butadiene.

According to the invention, copolymerizable monomers which contain at least one acid group are used as component (a4). Monomers which carry carboxyl or sulfo groups are particularly suitable for this purpose. α,β-unsaturated carboxylic acids, such as acrylic acid or methacrylic acid, and maleic acid, fumaric acid, itaconic acid, citraconic acid (methylmaleic acid), crotonic acid, cinnamic acid and vinylsulfonic acid or vinylbenzenesulfonic acid, are preferably used.

In a further embodiment, the components (a5) to (a7) are used instead of the components (a1) to (a4).

A diene such as butadiene or isoprene, or a derivative thereof, such as chloroprene or a mixture thereof is used as component (a5), butadiene being preferred.

The monomers stated above under component (a3) are used as component (a6).

The monomers stated above under component (a4) are used as component (a7).

The glass transition temperature of the 1st shell (A) is usually below 0° C., preferably below −20° C., particularly preferably below −30° C. (the glass transition temperature is determined, for example, with the aid of DSC; K. H. Illers, Makromol. Chem. 127 (1969), 1.

The 1st shell (A) is prepared, as a rule, by a known polymerization method, such as emulsion, mass, solution or suspension polymerization, preferably in aqueous emulsion in the presence of an aqueous emulsion of the silicone rubber core (cf. German Patent 1,260,135).

The conventional emulsifiers, such as the alkali metal salts of alkyl- or alkylarylsulfonic acids, alkylsulfates, fatty alcohol sulfonates, salts of higher fatty acids of 10 to 30 carbon atoms or resin soaps may be used for the preparation of the grafting base by emulsion polymerization. Sodium salts of alkylsulfonates or of fatty acids of 10 to 18 carbon atoms are preferably used. In general, emulsifiers are employed in amounts of from 0.1 to 5, preferably from 0.5 to 2, % by weight, based on the total weight of the monomers used for the preparation of the 1st shell (A).

If desired, nonionic or anionic surfactants may be used as coemulsifiers. Nonionic coemulsifiers are, for example, polyoxyethylene derivatives of fatty alcohols or fatty acids. Examples are POE (3)-lauryl alcohol, (POE= polyoxyethylene (x) where x=degree of polymerization), POE (20)-oleyl alcohol, POE (7)-nonylphenol and POE (10)-stearate. In general, a water/monomer ratio of from 10:1 to 0.7:1 is used.

The polymerization initiators usually used are hydroperoxides, the conventional persulfates and redox systems, such as hydroperoxide and ascorbic acid, if desired with the addition of $Fe^{2+}$ salts and complexing agents. The conventional redox systems are known to a person skilled in the art. The amount of initiators depends as a rule in a known manner on the desired molecular weight and is usually from 0.01 to 1, preferably from 0.05 to 0.5, % by weight, based on the total weight of the monomers.

In general, the conventional buffer substances such as sodium bicarbonate or sodium pyrophosphate (by means of which the pH of from 6 to 9 can be established), and molecular weight regulators, such as mercaptans, terpinols or dimeric alpha-methylstyrene, are used as polymerization assistants.

The exact polymerization conditions, in particular the type, metering and amount of the emulsifier, are usually determined individually within the abovementioned ranges so that the resulting latex of the crosslinked polymer has a d(50) value of from 40 to 2000 nm, preferably from 60 to 1000 nm, particularly preferably from 80 to 800 nm.

In the preparation of the 1st shell A in aqueous emulsion, temperatures of from 20° to 100° C., preferably from 40° to 80° C., are usually used.

According to the invention, the component (A) is used in an amount of from 10 to 89, preferably from 25 to 60, particularly preferably from 30 to 55, % by weight, based on the total amount of graft copolymer.

According to the invention, the component (B), the 2nd shell, is a mixture consisting essentially of (b1) from 50 to 99.99, preferably from 55 to 99.9, particularly preferably from 60 to 89.5, % by weight of a styrene compound of the formula I

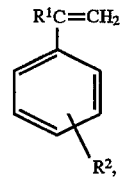

where $R^1$ and $R^2$ independently of one another are each hydrogen, $C_1$–$C_8$-alkyl or $C_1$–$C_4$-alkyl-monosubstituted, $C_1$–$C_4$-alkyl-disubstituted or $C_1$–$C_4$-alkyl-trisubstituted phenyl,
and/or
of a $C_1$–$C_8$-alkyl ester of methacrylic or acrylic acid, (b2) from 0 to 50, preferably from 0 to 40, particularly preferably from 10 to 40, % by weight of a monomer selected from the group consisting of methacrylonitrile, acrylonitrile, methacrylic acid, acrylic acid, maleic anhydride, maleimide N-substituted by $C_1$–$C_4$-alkyl, vinyl esters of aliphatic $C_2$–$C_8$-carboxylic acids, acrylamide and vinyl methyl ether and (b3) from 0.01 to 20, preferably from 0.1 to 10, particularly preferably from 0.5 to 5, % by weight of a copolymerizable monomer containing at least one basic group.

Styrene, α-methylstyrene, 1,1-diphenylethylene and styrenes alkylated in the nucleus by $C_1$–$C_8$-alkyl, such as p-methylstyrene or tert-butylstyrene, are preferably used as the styrene compound of the general formula I (component (b1)), styrene and α-methylstyrene being particularly preferred.

According to the invention, methyl methacrylate (MMA), ethyl methacrylate, n-propyl methacrylate, isopropyl methacrylate, n-butyl methacrylate, isobutyl methacrylate, sec-butyl methacrylate, tert-butyl methacrylate, pentyl methacrylate, hexyl methacrylate, heptyl methacrylate, octyl methacrylate or 2-ethylhexyl methacrylate, methyl methacrylate being particularly preferred, and mixtures of these monomers, methyl acrylate (MA), ethyl acrylate, propyl acrylate, n-butyl acrylate, isobutyl acrylate, sec-butyl acrylate, tert-butyl acrylate, pentyl acrylate, hexyl acrylate, heptyl acrylate, octyl acrylate or 2-ethylhexyl acrylate, n-butyl acrylate being particularly preferred, and mixtures of these monomers with one another as well as with the methacrylates and/or styrene compounds of the general formula I are used as $C_1$–$C_8$-alkyl esters of methacrylic or acrylic acid.

According to the invention, a monomer selected from the group consisting of methacrylonitrile, acrylonitrile, methacrylic acid, acrylic acid, maleic anhydride, maleimide N-substituted by $C_1$–$C_4$-alkyl, vinyl esters of aliphatic $C_2$–$C_8$-carboxylic acids, such as vinyl acetate or vinyl propionate, acrylamide and vinyl methyl ether is, if desired, used as component (b2).

In a preferred embodiment, a mixture of styrene and acrylonitrile (molar ratio usually from 10:1 to 1:1, preferably from 5:1 to 1:1) or α-methylstyrene and acrylonitrile (molar ratio usually from 10:1 to 1:1, preferably from 5:1 to 1:1) or methyl methacrylate and styrene (molar ratio usually from 10:1 to 1:1, preferably from 5:1 to 1:1) or methyl methacrylate alone, i.e. no component (b2), is used.

Examples of monomers carrying basic groups, component (b3), are those which are copolymerizable with the components (b1) and (b2) and carry at least one basic group. Preferred monomers (b3) contain a tertiary amino group in the molecule. Examples of these are dimethylaminoethyl acrylate and methacrylate, morpholine acrylate, morpholine methacrylate, N-vinylimidazole, p-dimethylaminostyrene, N-vinylcarbazole, N-vinylindole, n-vinylpyrrole, n-vinylpyrimidine, 2-, 3- and 4-vinylpyridine and mixtures of these monomers. Particularly preferred monomers are esters of acrylic or methacrylic acid with aliphatic alcohols which contain a tertiary amino group in the alkyl radical. Dimethylaminoethyl acrylate and dimethylaminoethyl methacrylate are preferred examples.

The 2nd shell, (B), is prepared, as a rule, by a conventional polymerization method, such as emulsion, mass, solution or suspension polymerization in the presence of the graft copolymer (A).

However, it is advantageous to carry out the graft copolymerization of component (B) onto the polymer (A) serving as the grafting base once again in aqueous emulsion. It may be effected in the same system as the polymerization of the grafting base, and further emulsifier and initiator may be added. These need not be identical to the emulsifiers and initiators used for the preparation of A2. The emulsifier, initiator and polymerization assistants may be initially taken, alone or as a mixture, with the emulsion of the grafting base (A). Any possible combination of initially taken substance and feed on the one hand and initiator, emulsifier and polymerization assistants on the other hand is possible. The preferred embodiments are known to a person skilled in the art. The monomer mixture to be grafted may be added to the reaction mixture all at once, batchwise in a plurality of stages or continuously during the polymerization.

In a further, preferred embodiment, the monomers of the graft and the shell are reversed, the monomers carrying acidic groups are present in the graft (component (B)) and monomers carrying basic groups are present in the rubber (component (A)). Here, component (a4) or (a7) comprises from 0.01 to 10% by weight of a monomer carrying one or more basic groups and component (b3) comprises from 0.01 to 20% by weight of a monomer carrying one or more acidic groups. These monomers have already been described in detail above. All other descriptions above relating to component (A) and constituents thereof are of course also applicable to this further, preferred embodiment.

The novel graft copolymers preferably have a median particle size of from 0.05 to 10 µm, particularly preferably from 0.1 to 1 µm.

According to the invention, the component (B) is used in an amount of from 20 to 89, preferably from 25 to 60, particularly preferably from 30 to 55, % by weight, based on the total amount of graft copolymer.

The novel graft copolymer thus prepared may be worked up by known methods, for example by coagulation of the latices with electrolytes (salts, acids or bases), by heating or freezing, by ultra-sonics, by shearing or by a combination of these methods.

The novel graft copolymers may be used alone as molding materials. They can be worked up for this purpose, for example by spray drying. However, the novel graft copolymers are preferably used for mixing with thermoplastic in order to increase its low-temperature toughness. Thermoplastics suitable for modification have glass transition temperatures of more than 25° C., preferably above 60° C. They are referred to below as a matrix.

According to the invention, the vinyl, methacrylate and acrylate polymers, which can be prepared as homo- and copolymers from the monomers stated under the components (a4), (b2) and (b3), are examples of suitable matrices. Particular examples are:

homo- and copolymers of a vinylaromatic monomer and a polar, copolymerizable, ethylenically unsaturated monomer, such as polystyrene, polymethyl methacrylate, styrene/acrylonitrile copolymers, α-methylstyrene/acrylonitrile copolymers, styrene/maleic anhydride copolymers, styrene/phenylmaleimide copolymers, styrene/methyl methacrylate copolymers, methyl methacrylate/acrylonitrile copolymers, styrene/acrylonitrile/maleic anhydride copolymers, styrene/acrylonitrile/phenylmaleimide copolymers, α-methylstyrene/acrylonitrile/methyl methacrylate copolymers, α-methylstyrene/acrylonitrile/tert-butyl methacrylate copolymers and styrene/acrylonitrile/tert-butyl methacrylate copolymers.

The stated copolymers are frequently formed as byproducts, for example in the graft polymerization for the preparation of the novel graft copolymers, particularly when large amounts of component (B) are grafted onto small amounts of component (A). The vinyl polymers and (meth) acrylate polymers can be prepared by known free radical, anionic and cationic polymerization methods. The known redox polymerization or the known polymerization with organometallic mixed catalysts may also be advantageous.

Polycarbonate (PC) alone or as a mixture with other above-mentioned matrix polymers may be employed as another matrix to be used according to the invention.

Preferred novel blend components are, for example, mixtures of polycarbonate with the novel graft copolymers described above and other thermoplastics. Here, the polycarbonate content and the content of the novel graft copolymers and further thermoplastics as the matrix are each preferably from 5 to 95% by weight.

Suitable polycarbonates are, for example, those based on diphenols of the formula (II)

$$\text{HO—Ar—A—Ar—OH} \qquad \qquad \text{(II)}$$

where

Ar is phenyl which is unsubstituted or monosubstituted, disubstituted or trisubstituted by $C_1$–$C_4$-alkyl or by halogen and A is a single bond, $C_1$–$C_3$-alkylene, $C_2$–$C_3$-alkylidene, $C_3$–$C_6$-cycloalkylidene, —S— or —$SO_2$—.

Preferred diphenols of the formula (II) are, for example, hydroquinone, resorcinol, 4,4'-dihydroxybiphenyl, 2,2-bis-(4-hydroxyphenyl)-propane, 2,4-bis-(4-hydroxyphenyl)-2-methylbutane and 1,1-bis-(4-hydroxyphenyl)-cyclohexane. 2,2-bis-(4-Hydroxyphenyl)-propane and 1,1-bis-(4-hydroxyphenyl)-cyclohexane are particularly preferred.

The diphenols of the formula (II) are known per se or can be prepared by known processes.

The diphenols of the formula (II) may be used both individually and as a mixture for the preparation of the polycarbonates.

The suitable polycarbonates may be branched in a known manner, preferably by incorporation of from 0.05 to 2.0 mol %, based on the sum of the diphenols used, of at least trifunctional compounds, for example those having three or more phenolic OH groups.

Polycarbonates which have proven particularly suitable are those which have relative viscosities $\eta_{rel}$ of from 1.10 to 1.50, in particular from 1.25 to 1.40 (measured as 0.5% strength by weight solutions of the polymers in chloroform at 23° C.). This corresponds to weight average molecular weights $M_w$ of from 10,000 to 200,000, preferably from 20,000 to 80,000, g/mol.

The preparation of the polycarbonates can be carried out, for example, by reacting the diphenols of the general formula (II) with phosgene by the phase boundary method or with phosgene by the method in the homogeneous phase (i.e. the pyridine method), the molecular weight to be established in each case being obtained in a known manner by means of a corresponding amount of known chain terminators (regarding polydiorganosiloxane-containing polycarbonates, cf. for example German Laid-Open Application DOS 3,334,782).

Examples of suitable chain terminators are phenol and p-tert-butylphenol as well as long-chain alkylphenols, such as 4-(1,3-tetramethylbutyl)-phenol, according to German Laid-Open Application DOS 2,842,005, or monoalkylphenols or dialkylphenols having a total of 8 to 20 carbon atoms in the alkyl substituents, according to DE-A 35 06 472, for example p-nonylphenol, 3,5-di-tert-butylphenol, p-tert-octylphenol, p-dodecylphenol, 2-(3,5-dimethylheptyl)-phenol and 4-(3,5-dimethylheptyl)-phenol.

For example, polycarbonate/polysiloxane block copolymers, polycarbonate/polyether block copolymers and polycarbonate/polyester block copolymers may also serve as the matrix.

Other suitable matrices include in general aromatic polyesters and polyester carbonates.

The novel thermoplastic molding materials may contain conventional additives and assistants as further components. Examples of these are dyes and pigments, light stabilizers, heat stabilizers, plasticizers, blowing agents and organic or inorganic fillers in particulate, powder or fibrous form.

The additives and assistants are used in conventional amounts, preferably in amounts of up to 50% by weight, based on the total weight of the thermoplastic molding material. Compatible plastics may also account for a relatively high proportion.

In addition to the polymers stated as matrices, the novel graft copolymers may also be mixed with the following polymers:

polyphenylene ethers, polyamides, polyesters, polyurethanes, polyethylenehomo- and copolymers, polypropylenehomo- and copolymers, halogenated polyolefins, such as polyvinyl chloride, polytetrafluoroethylene and derivatives, and polyoxymethylenes, polyetherketones, polyethersulfones and polysulfones.

In a further preferred embodiment, the novel graft copolymers are mixed with known rubber-modified plastics, e.g. ABS or ASA. ABS (based on butadiene graft rubbers with styrene/acrylonitrile copolymers) and ASA molding materials (based on acrylate graft rubbers with styrene/acrylonitrile copolymers) are known to a person skilled in the art and are described in, inter alia, DE 1260135 and EP 62901. It is preferable to dull such already toughened thermoplastics by adding the novel graft copolymers and, if desired, the copolymers mentioned as matrices and comprising a vinylaromatic monomer and a polar, copolymerizable ethylenically unsaturated monomer.

The novel, thermoplastic molding materials are processed, as a rule, by known methods, such as extrusion, injection molding, compression molding of the melt, kneading, etc. The mixtures melted in this manner are usually cooled and then processed to give moldings (as a rule by injection molding), after which the mechanical properties are tested.

The novel thermoplastic molding materials can be processed by the methods usually used for processing thermoplastics, such as extrusion and injection molding, to give a very wide range of moldings, such as window profiles, garden furniture, boats, sign-boards, lamp coverings, automotive parts and toys. The novel thermoplastic molding materials are particularly suitable for the production of moldings where good low-temperature toughness, good weathering stability and at the same time a dull surface are required.

EXAMPLES

The notched impact strength $a_k$ (injection molding temperature/test temperature) (in $kj/m^2$) was determined at test temperatures of 23° C. and −40° C. according to DIN 53453 using standard small bars injection molded at 220°, 250° and 280° C.

The surface quality (dull or glossy) was determined visually by viewing under sunlight at an angle of 45° to the surface of the shaped article.

The stated median particle sizes are the weight average of the particle sizes which were determined by means of an analytical ultracentrifuge according to the method of W. Scholtan and H. Lange, Kolloid-Z. and Z. Polymere 250 (1972), 782–796. The ultracentrifuge measurement gives the integral mass distribution of the particle diameter of a sample. From this it is possible to determine the percentage by weight of particles which have a diameter equal to or smaller than a certain size. The median particle diameter, which is also referred to as the $d_{50}$ value of the integral mass distribution, is defined as the particle diameter at which 50% by weight of the particles have a diameter smaller than the diameter corresponding to the $d_{50}$ value. Likewise, 50% by weight of the particles then have a diameter larger than the $d_{50}$ value.

1. Preparation of the graft copolymers A 1.1 A crosslinked polydimethylsiloxane emulsion (prepared similarly to Example 1 of EP-A 492 376) was used as silicon emulsion A1: solids content (SC): 17.4%; particle diameter 156 nm; viscosity 4.6 mPa.s; pH 7; degree of crosslinking 3%; 0.5% of methacryloyloxypropyl functions.

1.2 Preparation of the 1st shell A2

1.2.1 Initially taken mixture Emulsion A1 (cf. Table 1) and water were heated to 60° C. and potassium persulfate (KPS) was then added.

1.2.2 Feed A mixture of n-butyl acrylate (BA) and the acrylate of tricyclodecenyl alcohol (DCPA) was then added dropwise in the course of 1.5 hours. At the same time, a mixture of water and the sodium salts of a mixture of $C_{13}$- and $C_{14}$-alkanesulfonic acids (soap) was added dropwise. The emulsion A2 obtained was not isolated.

1.3 Preparation of the 2nd shell 5.1 g of potassium persulfate were added to the emulsion A2 and the monomers from Table 1 (styrene, acrylonitrile and, if required, dimethylaminoethyl acrylate (DMAEA)) were added dropwise in the course of 3 hours. Stirring was continued for 2 hours. Theoretical solids content: 40.0%.

TABLE 1

Preparation of siloxane/acrylate rubbers
(All stated amounts in gram)

| Experiment: | 1 (Comparison) | 2 (Comparison*) | 1 |
|---|---|---|---|
| Initially taken mixture | | | |
| Component A1 | 1839 | | 1839 |
| Water | 3086 | | 3086 |
| KPS | 4.8 | | 4.8 |
| Feed | | | |
| BA | 1568 | | 1552 |
| Methacrylic acid | — | | 16 |
| DCPA | 32 | | 32 |
| Water | 212 | | 212 |
| Soap | 8 | | 8 |
| Feed 2 | | | |
| KPS | 5.1 | | 5.1 |
| Acrylonitrile | 320 | | 320 |
| Styrene | 960 | | 935 |
| DMAEA | — | | 25 |
| Mechanical properties | | | |
| $a_K$ (220/23) | 26 | 21 | 24 |
| $a_K$ (250/23) | 25 | 19 | 27 |
| $a_K$ (280/23) | 26 | 19 | 25 |
| $a_K$ (280/−40) | 4 | 1 | 4 |
| Surface | glossy | dull | dull |

*)According to the prior art EP 450511, Table 1, Example 2.

Experiment 1 and Comparative Experiment 2 had the same amount of comonomers but the latter had no silicone core.

Component B

A solution polymer of styrene and acrylonitrile in the weight ratio of 65:35, having a viscosity number of 80 ml/g (measured at 23° C. in a 0.5% strength by weight dimethylformamide solution) was used.

Preparation of the mixtures

The rubbers (Experiment V1, V2 and 1) were mixed with the component B in a weight ratio of 1:1, the mixture was extruded at 250° C. in a ZSK 30 twin-screw extruder from Werner & Pfleiderer and the extrudate was granulated. Moldings for mechanical testing were produced from the granules at 220°, 250° and 280° C. (Table 1).

We claim:

1. A thermoplastic molding material comprising (I) from 1 to 95% by weight of a graft copolymer prepared by (A) polymerizing from 10 to 89% by weight based on the total amount of said graft copolymer of a mixture consisting essentially of either (a1) from 70 to 99.89% by weight of a $C_1$–$C_{18}$-alkyl ester of acrylic acid, where the alkyl radical is optionally monosubstituted by phenyl or phenoxy, (a2) from 0.1 to 10% by weight of a polyfunctional monomer which is a vinylically unsaturated compound having at least two double bonds, (a3) from 0 to 29.89% by weight of an ethylenically unsaturated monomer which differs from (a1) and (a2), is copolymerizable therewith and carries no acid group or basic group and (a4) from 0.01 to 10% by weight of a copolymerizable monomer containing at least one acid group or at least one basic group or (a5) from 49.99 to 99.99% by weight of at least one diene, (a6) from 0 to 50% by weight of a monomer which is copolymerizable therewith and carries no acid group and (a7) from 0.01 to 10% by weight of a copolymerizable monomer containing at least one acid group or at least one basic group in the presence of from 1 to 80% by weight of a crosslinked silicone rubber based on the total amount of said graft copolymer to form the copolymer A and (B) polymerizing from 20 to 89% by weight based on the total amount of said graft copolymer of a mixture consisting essentially of (b1) from 50 to 99.99% by weight of a $C_1$–$C_8$ alkyl ester of methacrylic acid or acrylic acid and/or a styrene compound of the formula (I)

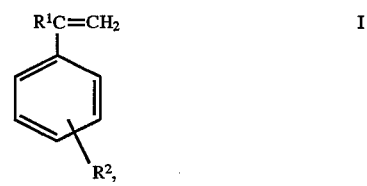

where $R^1$ and $R^2$ independently of one another are each hydrogen, $C_1$–$C_8$-alkyl or $C_1$–$C_4$-alkyl-monosubstituted, $C_1$–$C_4$-alkyl-disubstituted or $C_1$–$C_4$-alkyl-trisubstituted phenyl, (b2) from 0 to 50% by weight of a monomer selected from the group consisting of methacrylonitrile, acrylonitrile, methacrylic acid, acrylic acid, maleic anhydride, maleimide N-substituted by $C_1$–$C_4$-alkyl, vinyl esters of aliphatic $C_2$–$C_8$-carboxylic acids, acrylamide and vinyl methyl ether and p1 (b3) from 0.01 to 20% by weight of a copolymerizable monomer containing at least one basic group or at least one acid group in the presence of the copolymer (A)

with the proviso that when the at least one group of (a4) or (a7) is an acid group, the at least one group of (b4) is a basic group and when the at least one group of (a4) or (a7) is basic group the at least one group of (b4) is an acid group, said thermoplastic molding material further comprising (II) at least one thermoplastic polymer having a glass transition temperature of more than 25° C. as a matrix.

2. The thermoplastic molding material as defined in claim 1 further comprising additives and assistants.

3. The thermoplastic molding material as defined claim 1 wherein the at least one group of (a4) or (a7) of the graft copolymer is a basic group, and the at least one group of (b3) of the graft copolymer is an acid group.

4. A thermoplastic molding material as defined in claim 1 wherein the graft copolymer has a median particle size of from 0.05 to 10 micrometers.

5. The thermoplastic molding material of claim 4 wherein in the graft copolymer a $C_2$–$C_4$-alkyl ester of methacrylic or acrylic acid, where the $C_2$–$C_6$-alkyl moiety is monosubstituted or disubstituted by amino is used as component (a4) and an alpha, beta-unsaturated $C_1$–$C_6$-carboxylic acid us used as component (b3).

6. The thermoplastic molding material of claim 1 wherein the at least one group of (a4) or (a7) is an acid group, and the at least one group of (b3) is a basic group.

7. A molding prepared from the thermoplastic molding material as defined in claim 1.

* * * * *

UNITED STATES PATENT AND TRADEMARK OFFICE
CERTIFICATE OF CORRECTION

PATENT NO.: 5,652,307

DATED: July 29, 1997

INVENTOR(S): NIESSNER et al.

It is certified that error appears in the above-identified patent and that said Letters Patent is hereby corrected as shown below:

On the cover page, item [54], and Column 1, lines 2,
--THREE-STAGE SILICONE RUBBER BASED GRAFT COPOLYMERS--.

Column 12, claim 1, line 33,
" methyl ether and p1 (b3) from 0.01 to 20% by weight"

should read as follows:
-- methyl ether and
(b3) from 0.01 to 20% by weight--.

Column 12, claim 5, line 57, "acid us" should be --acid is--.

Signed and Sealed this

Fourteenth Day of October, 1997

Attest:

BRUCE LEHMAN

*Attesting Officer*    *Commissioner of Patents and Trademarks*